United States Patent [19]

House et al.

[11] 4,420,406

[45] Dec. 13, 1983

[54] THICKENED HEAVY BRINES

[75] Inventors: Roy F. House, Houston; Lonnie D. Hoover, Chappell Hill, both of Tex.

[73] Assignee: NL Industries, Inc., New York, N.Y.

[21] Appl. No.: 161,444

[22] Filed: Jun. 20, 1980

[51] Int. Cl.$^3$ .............................................. E21B 43/00
[52] U.S. Cl. ............................ 252/8.55 R; 252/363.5
[58] Field of Search ............ 252/8.5 A, 8.5 C, 8.55 R, 252/363.5

[56] References Cited

U.S. PATENT DOCUMENTS

| | | | |
|---|---|---|---|
| 3,297,583 | 1/1967 | Dierichs et al. | 252/363.5 |
| 3,852,201 | 12/1974 | Jackson | 252/8.5 |
| 4,046,197 | 9/1977 | Gruesbeck et al. | 252/8.5 X |
| 4,169,797 | 10/1979 | Johnston et al. | 252/8.55 |
| 4,175,042 | 11/1979 | Mondshine | 252/8.55 |
| 4,330,414 | 5/1982 | Hoover | 252/8.5 |
| 4,350,601 | 9/1982 | Mosier et al. | 252/8.55 |

FOREIGN PATENT DOCUMENTS 2000799  1/1979  United Kingdom .

OTHER PUBLICATIONS

Stauffer et al., International Application Published Under the Patent Cooperation Treaty, Int. Publication No. WO80/00590, 4-3-80.

*Primary Examiner*—Herbert B. Guynn
*Attorney, Agent, or Firm*—Browning, Bushman, Zemecki & Anderson

[57] ABSTRACT

A thickened brine solution useful as a well servicing fluid is prepared, said solution consisting essentially of water, at least 20% by weight zinc bromide, calcium bromide, and a viscosifying amount of hydroxyethyl cellulose.

13 Claims, No Drawings

THICKENED HEAVY BRINES

BACKGROUND OF THE INVENTION

The present invention relates to thickened brine solutions and, more particularly, to so called heavy brines having a density of about 14.2 pounds per gallon (ppg) or greater.

Hydroxyethyl cellulose (HEC) is used as a viscosifyer in aqueous solutions containing dissolved salt. Being non-ionic, it is one of the few materials which will hydrate in and efficiently viscosify heavy brine solutions of the type used as well servicing fluids, e.g. in workover and completion operations.

Heavy brine solutions having a density greater then about 15.0 ppg contain a soluble salt having a density greater than the density of calcium bromide. Usually, zinc chloride and/or zinc bromide is used, preferably zinc bromide. It is sometimes necessary to utilize a brine solution having a density in the range of about 14.2 ppg to about 15.0 ppg which has a lower temperature of crystallization than a similar density solution containing calcium chloride and calcium bromide. Such a solution can be formulated, from a density standpoint, using zinc bromide. However, we have found that if the zinc bromide concentration is less than about 20% by weight, the HEC will not gel or thicken the brine. Indeed, we have found that while it is possible to viscosify a brine solution containing no zinc bromide or a brine solution containing a high concentration of zinc bromide, if the two thickened solutions are admixed to produce a solution containing zinc bromide in less than about a 20% by weight concentration, the viscosity of the mixed brine will be essentially the same as if no HEC is present.

SUMMARY OF THE INVENTION

It is therefore an object of the present invention to provide thickened brine solutions containing zinc bromide and HEC.

Another object of the present invention is to provide a method for preparing such thickened brines.

The above and other objects of the present invention will become apparent from the description given herein and the appended claims.

In one embodiment, the present invention provides a thickened brine consisting essentially of water, at least 20% by weight zinc bromide, calcium bromide, and a viscosifying amount of hydroxyethyl cellulose.

In another embodiment, the present invention provides a method of preparing thickened brines in which an aqueous solution consisting essentially of water, at least 20% by weight zinc bromide and calcium bromide is admixed with a viscosifying amount of hydroxyethyl cellulose.

DESCRIPTION OF THE PREFERRED EMBODIMENT

The present invention is based on the discovery that if the zinc bromide concentration in a brine solution is kept at at least about 20% or greater by weight, the brine can be thickened or gelled with hydroxyethyl cellulose. Thus, brine solutions of widely varying densities containing zinc bromide, calcium bromide and/or calcium chloride can be formulated.

The HEC polymers which are useful in the present invention, depending upon the method of preparation of the thickened brines, can either be in the form of a dry powder, essentially untreated, or, in the preferred case, can be an "activated" HEC. The term activated as used herein refers to an HEC polymer which will substantially hydrate or solubilize in a brine solution having a density greater than about 14.2 pounds per gallon (ppg) without the necessity for mixing, as by rolling, at elevated temperatures. Examples of such activated HEC polymers are to be found in co-pending U.S. Patent applications Ser. Nos. 119,805, filed Feb. 8, 1980, now U.S. Pat. No. 4,330,414 and 146,286, filed May 5, 1980, herein incorporated by referemce for all purposes. As disclosed in the aforementioned patent applications, HEC polymers which have been activated will solubilize in brine solutions without the necessity for rolling, or other forms of mixing at elevated temperatures. In general, any HEC polymer which will solubilize in a brine having a density in excess of about 14.2 ppg at room temperature can be considered an "activated" HEC. It is to be understood, however, that the present invention is not limited to the use of activated HEC polymers. Depending on the condition of mixing, and the composition of the brine, unactivated HEC polymers are compatible with brine solutions used in the present invention. The term "compatible" as used herein means that the HEC polymer can be solvated or solubilized in a given brine solution with the use of mixing techniques such as rolling at elevated temperatures. Thus, an incompatible system is one in which the HEC polymer will not solubilize in the brine regardless of the mixing conditions used.

In formulating the brine solutions used in the present invention, zinc bromide, calcium bromide, and, in certain cases, calcium chloride are employed depending upon the desired density and the desired temperature of crystallization of the brine. We have found that the presence or absence of calcium chloride and the desired density of the brine determines the minimum amount of zinc bromide which can be utilized in the brine either to form brines which are compatible with HEC or which can be viscosified with an activated HEC at room temperature. Basically, there exist four cases:

CASE 1: Solutions containing zinc bromide and calcium bromide which contain no calcium chloride are compatible with HEC provided that the minimum percent zinc bromide in the brine solution is as follows:

| Solution Density (D), ppg | Minimum % $ZnBr_2$ |
|---|---|
| 14.2–15.63 | 20 |
| 15.63–18.0 | $\frac{(1094.4)}{D} \frac{(D - d)}{(19.2 - d)}$ | where d is the density (ppg) of a solution mixed with a zinc bromide solution having a density of 19.2 ppg. In instances where another solution containing zinc bromide is used rather than a 19.2 ppg zinc bromide solution, the minimum percent zinc bromide which can be used in a brine having a density of from 15.63 to 18.0 ppg is $$\frac{(w)(p)}{D} \frac{(D - d)}{(w - d)}$$

where w is the density (ppg) of the zinc bromide solution and p is the percent zinc bromide in that solution.

CASE 2: Solutions which contain zinc bromide, calcium bromide and calcium chloride are compatible with HEC provided that the maximum percent calcium chloride in the solution is $(2 \times 33)\%$ wherein x is the percent zinc bromide in the solution. In this case, the minimum percent zinc bromide in the solution is as follows:

| Solution Density (D), ppg | Minimum % $ZnBr_2$ |
|---|---|
| 14.2–15.63 | 20 |
| 15.63–17.0 | 8.57D–113.7 |

CASE 3: $ZnBr_2/CaBr_2$ brine solutions containing no calcium chloride can be gelled or viscosified at room temperature with an activated HEC composition provided that the minimum percent zinc bromide in the solution is as follows:

| Solution Density (D), ppg | Minimum % $ZnBr_2$ |
|---|---|
| 14.2–15.2 | 20 |
| 15.2–16.0 | 5.75D–67.4 |
| 16.0–18.0 | $\frac{(1094.4)}{D} \frac{(D-d)}{(19.2-d)}$ | where d is the density (ppg) of a solution containing only calcium bromide which is mixed with a 19.2 ppg zinc bromide solution. If another solution containing zinc bromide replaces the 19.2 ppg zinc bromide solution, then the minimum percent zinc bromide in the density range from 16.0 to 18.0 ppg is $$\frac{(w)(p)}{D} \frac{(D-d)}{(w-d)}$$

where w is the density (ppg) of the zinc bromide solution and p is the percent zinc bromide in the solution CASE 4: $ZnBr_2/CaBr_2$ brine solutions containing calcium chloride can be gelled or viscosified at room temperature with an activated HEC composition provided that the maximum weight percent calcium chloride in the solution is $(2 \times 33)\%$ where x is the percent zinc bromide in the solution. The minimum percent zinc bromide in the solution is as follows:

| Solution Density (D), ppg | Minimum % $ZnBr_2$ |
|---|---|
| 14.2–14.5 | 20 |
| 14.5–16.55 | 4(D–9.5) |
| 14.5–17.0 | 4(D–9) |
| 14.5–17.45 | 4(D–8.5) | wherein D is the density of the brine solution in ppg.

In formulating the thickened brines of the present invention, the HEC will be present in a viscosifying amount, generally in a concentration of from about 1 to about 5 ppb (pounds per 42 gallon barrel).

To more fully illustrate the present invention, the following non-limiting examples are presented. All percentages given in the examples and throughout the specification are by weight unless otherwise indicated. All physical property measurements were made in accordance with testing procedures set forth in Standard Procedure For Testing Drilling Fluids API RP 13B, 7th Edition, April, 1978. The HEC polymer employed, unless otherwise indicated, was an HEC marketed by Hercules, Inc., under the tradename NATROSOL 250 HHR. In formulating the brine solutions, the following salt solutions were employed:

| 19.2 ppg solution | aqueous solution containing 20% $CaBr_2$ and 57% $ZnBr_2$ |
| 14.2 ppg solution | aqueous solution containing 53% $CaBr_2$ |
| 11.6 ppg solution | aqueous solution containing 37.6% $CaCl_2$ |

EXAMPLE 1

Various brine solutions were admixed with an activated HEC containing 20% NATROSOL 250 HHR, 25% glycerin, 54.6% isopropanol, and 0.4% fumed silica to produce a final solution containing 3 ppb HEC. The mixing was conducted on a Multimixer for one minute. Thereafter, the rate of hydration of the HEC was measured by stirring the solutions on a Fann-VG-Meter at 300 rpm and periodically reading the dial reading over a 60 minute period. The solutions were then hot rolled overnight at 150° F. to determine the final viscosity. The data obtained are given in Table 1.

TABLE 1

| Composition of Solution | | | | | | | | 3 ppb. NATROSOL 250 HHR | |
|---|---|---|---|---|---|---|---|---|---|
| | | | | 19.2 | 11.6 | 14.2 | 95% | Fann 300 rpm Reading | |
| Density ppg. | % $ZnBr_2$ | % $CaCl_2$ | % $CaBr_2$ | ppg bbl. | ppg bbl. | ppg bbl. | $CaCl_2$ lb. | Initial | After Rolling 16 Hr. @ 150° F.* |
| 15.0 | 11.7 | 0 | 46.2 | 0.160 | 0 | 0.840 | 0 | 7 | 14 |
| 15.1 | 13.0 | 0 | 45.5 | 0.180 | 0 | 0.82 | 0 | 7 | 27 |
| 15.3 | 15.7 | 0 | 43.9 | 0.220 | 0 | 0.780 | 0 | 10 | 37 |
| 15.5 | 18.4 | 0 | 42.4 | 0.260 | 0 | 0.740 | 0 | 48 | 222 |
| 15.8 | 22.2 | 0 | 40.2 | 0.320 | 0 | 0.680 | 0 | 130 | OS |
| 16.0 | 24.6 | 0 | 38.7 | 0.360 | 0 | 0.640 | 0 | 127 | OS |
| 16.5 | 30.5 | 0 | 35.3 | 0.460 | 0 | 0.540 | 0 | 154 | OS |
| 17.0 | 36.1 | 0 | 32.1 | 0.560 | 0 | 0.440 | 0 | 197 | OS |
| 17.5 | 41.3 | 0 | 29.1 | 0.660 | 0 | 0.340 | 0 | OS | OS |
| 18.0 | 46.2 | 0 | 26.3 | 0.260 | 0 | 0.240 | 0 | OS | OS |
| 18.5 | 50.9 | 0 | 23.6 | 0.860 | 0 | 0.140 | 0 | OS | OS |
| 19.0 | 55.3 | 0 | 21.0 | 0.960 | 0 | 0.040 | 0 | OS | OS |
| 15.0 | 0 | 16.3 | 43.2 | 0 | 0.0286 | 0.8637 | 103.0 | 291 | OS |
| 15.1 | 1.7 | 15.8 | 42.5 | 0.024 | 0.028 | 0.843 | 100.5 | 29 | 29 |
| 15.3 | 5.1 | 14.9 | 41.1 | 0.071 | 0.027 | 0.802 | 95.7 | 29 | 24 |
| 15.5 | 8.4 | 13.9 | 39.8 | 0.119 | 0.025 | 0.761 | 90.7 | 28 | 26 |
| 15.8 | 13.2 | 12.5 | 37.8 | 0.190 | 0.023 | 0.700 | 83.4 | 23 | 25 |
| 16.0 | 16.3 | 11.6 | 36.6 | 0.238 | 0.022 | 0.658 | 78.5 | 25 | 24 |
| 16.5 | 23.7 | 9.5 | 33.6 | 0.357 | 0.018 | 0.555 | 66.2 | 28 | 175 |
| 17.0 | 30.6 | 7.5 | 30.7 | 0.476 | 0.015 | 0.453 | 54.0 | 38 | 160 |

TABLE 1-continued

| Composition of Solution | | | | | | | | 3 ppb. NATROSOL 250 HHR | |
|---|---|---|---|---|---|---|---|---|---|
| | | | | 19.2 | 11.6 | 14.2 | 95% | Fann 300 rpm Reading | |
| Density ppg. | % ZnBr₂ | % CaCl₂ | % CaBr₂ | ppg bbl. | ppg bbl. | ppg bbl. | CaCl₂ lb. | Initial | After Rolling 16 Hr. @ 150° F.* |
| 17.5 | 37.1 | 5.7 | 28.1 | 0.592 | 0.012 | 0.350 | 41.7 | 75 | OS |
| 18.0 | 43.1 | 3.9 | 25.5 | 0.714 | 0.008 | 0.247 | 29.5 | 158 | OS |
| 18.5 | 49.3 | 2.2 | 23.1 | 0.833 | 0.005 | 0.144 | 17.2 | OS | OS |
| 19.0 | 54.8 | 0.6 | 20.9 | 0.952 | 0.0014 | 0.0415 | 4.9 | OS | OS |

*OS = Off-scale, >300.

As can be seen from Table 1, solutions containing less than about 20% ZnBr₂ cannot be efficiently gelled or viscosified even with an activated HEC.

EXAMPLE 2

Brine solutions having varying densities were formulated using various salt solutions and, in some cases, solid calcium chloride. The brine solutions were mixed on a Multimixer for 5 minutes with an activated HEC containing 20% NATROSOL 250 HHR, 25% 0.25 N sodium hydroxide and 55% isopropanol to form brine solutions having 2 ppb HEC. The solutions were then rolled 55 minutes at room temperature and the Fann 300 rpm readings obtained. Following rolling for 16 hours at 150° F., cooling to room temperature and mixing 5 minutes on a Multimixer, the Fann 300 rpm readings were obtained again. The data are given in Table 2.

TABLE 2

| Composition of Solution | | | | | | | | 2 ppb. NATROSOL 250 HHR | |
|---|---|---|---|---|---|---|---|---|---|
| | | | | 19.2 | 11.6 | 14.2 | 95% | Fann 300 rpm Reading | |
| Density ppg. | % ZnBr₂ | % CaCl₂ | % CaBr₂ | ppg bbl. | ppg bbl. | ppg bbl. | CaCl₂ lb. | Initial | After Rolling 16 Hr. @ 150° F.* |
| 14.5 | 20 | 0 | 36.1 | 0.265 | 0 | 0.561 | 0 | 73 | 110 |
| 15.0 | 20 | 0 | 38.5 | 0.274 | 0 | 0.628 | 0 | 75 | 125 |
| 15.2 | 20 | 0 | 39.5 | 0.278 | 0 | 0.656 | 0 | 57 | 132 |
| 15.4 | 20 | 0 | 40.4 | 0.281 | 0 | 0.683 | 0 | 37 | 132 |
| 15.6 | 20 | 0 | 41.3 | 0.285 | 0 | 0.711 | 0 | 33 | 138 |
| 15.8 | 20 | 0.02 | 40.9 | 0.289 | 0 | 0.711 | 0.16 | 31 | 138 |
| 16.0 | 20 | 0.05 | 40.3 | 0.292 | 0 | 0.708 | 0.35 | 30 | 142 |
| 14.5 | 20 | 18.6 | 18.8 | 0.265 | 0.481 | 0.226 | 26.7 | 10 | 16 |
| 15.0 | 20 | 16.2 | 23.8 | 0.274 | 0.350 | 0.334 | 40.1 | 13 | 19 |
| 15.2 | 20 | 15.3 | 25.7 | 0.278 | 0.297 | 0.378 | 45.3 | 14 | 19 |
| 15.4 | 20 | 14.3 | 27.6 | 0.281 | 0.244 | 0.422 | 50.5 | 17 | 19 |
| 15.6 | 20 | 13.7 | 29.5 | 0.285 | 0.190 | 0.467 | 58.0 | 17 | 21 |
| 15.8 | 20 | 12.5 | 31.3 | 0.289 | 0.138 | 0.509 | 60.9 | 20 | 21 |
| 16.0 | 20 | 11.7 | 33.1 | 0.292 | 0.085 | 0.554 | 66.1 | 20 | 25 |
| 14.5 | 26 | 0 | 30.6 | 0.3445 | 0 | 0.413 | 0 | 86 | 109 |
| 15.0 | 26 | 0 | 33.0 | 0.356 | 0 | 0.477 | 0 | 93 | 122 |
| 15.2 | 26 | 0 | 34.0 | 0.361 | 0 | 0.502 | 0 | 101 | 128 |
| 15.4 | 26 | 0 | 34.9 | 0.366 | 0 | 0.527 | 0 | 114 | 140 |
| 15.6 | 26 | 0 | 35.8 | 0.371 | 0 | 0.552 | 0 | 118 | 142 |
| 15.8 | 26 | 0 | 36.6 | 0.375 | 0 | 0.578 | 0 | 119 | 154 |
| 16.0 | 26 | 0 | 37.5 | 0.380 | 0 | 0.603 | 0 | 108 | 157 |
| 14.5 | 26 | 18.6 | 12.9 | 0.3445 | 0.575 | 0.072 | 8.5 | 67 | 139 |
| 15.0 | 26 | 16.1 | 18.0 | 0.356 | 0.445 | 0.177 | 20.9 | 62 | 161 |
| 15.2 | 26 | 15.1 | 19.9 | 0.361 | 0.394 | 0.2175 | 25.7 | 65 | 174 |
| 15.4 | 26 | 14.2 | 21.8 | 0.366 | 0.342 | 0.259 | 30.6 | 73 | 180 |
| 15.6 | 26 | 13.4 | 23.6 | 0.371 | 0.291 | 0.300 | 36.1 | 84 | 197 |
| 15.8 | 26 | 12.5 | 25.5 | 0.375 | 0.239 | 0.343 | 41.1 | 68 | 191 |
| 16.0 | 26 | 11.6 | 27.1 | 0.380 | 0.188 | 0.383 | 46.0 | 72 | 203 |
| 15.6 | 20 | 0 | 41.3 | 0.285 | 0 | 0.711 | 0 | 33 | 138 |
| 15.6 | 22 | 0 | 39.5 | 0.3135 | 0 | 0.658 | 0 | 68 | 143 |
| 15.6 | 24 | 0 | 37.6 | 0.342 | 0 | 0.605 | 0 | 102 | 144 |
| 15.6 | 26 | 0 | 35.8 | 0.371 | 0 | 0.552 | 0 | 122 | 142 |
| 15.6 | 28 | 0 | 33.9 | 0.399 | 0 | 0.500 | 0 | 122 | 140 |
| 15.6 | 30 | 0 | 32.1 | 0.428 | 0 | 0.446 | 0 | 120 | 140 |
| 15.6 | 32 | 0 | 30.2 | 0.456 | 0 | 0.394 | 0 | 115 | 127 |
| 15.6 | 34 | 0 | 28.3 | 0.485 | 0 | 0.340 | 0 | 112 | 105 |
| 15.6 | 20 | 13.7 | 29.5 | 0.285 | 0.190 | 0.467 | 58.0 | 17 | 21 |
| 15.6 | 22 | 13.4 | 27.5 | 0.3135 | 0.224 | 0.410 | 49.3 | 17 | 25 |
| 15.6 | 24 | 13.4 | 25.6 | 0.342 | 0.258 | 0.356 | 42.7 | 16 | 35 |
| 15.6 | 26 | 13.4 | 23.6 | 0.371 | 0.291 | 0.300 | 36.1 | 48 | 184 |
| 15.6 | 28 | 13.3 | 21.7 | 0.399 | 0.3245 | 0.246 | 29.0 | 74 | 194 |
| 15.6 | 30 | 13.3 | 19.7 | 0.428 | 0.358 | 0.190 | 22.5 | 100 | 196 |
| 15.6 | 32 | 13.3 | 17.7 | 0.456 | 0.392 | 0.135 | 16.0 | 106 | 194 |
| 15.6 | 34 | 13.2 | 15.8 | 0.485 | 0.425 | 0.080 | 9.4 | 116 | 193 |

As can be seen from the date in Table 2, the solubilization of the HEC is different in CaBr₂ZnBr₂ solutions as opposed to CaCl₂/CaBr₂/ZnBr₂ solutions. As can also be seen, the calcium chloride has a retarding effect on the solubilization of the HEC, the effect being dependent upon the ZnBr₂ concentration. The data further show that CaBr₂/ZnBr₂ solutions containing 20% ZnBr₂ and having a density in the range of from about 14.2 to about 15.6 ppg are compatible with HEC. Lastly, it can be seen that activated HEC will hydrate or solubilize at room temperature in CaBr₂/ZnBr₂ solutions containing 20% zinc bromide provided the density is no greater than about 15.2 ppg.

EXAMPLE 3

Various brine solutions were admixed with an activated HEC containing 20% NATROSOL 250 HHR, 25% glycerol, 54.6% isopropanol and 0.4% fumed silica by mixing for 15 minutes on a Multimixer and allowing the solutions to age overnight at room temperature. The data, obtained on duplicate one gallon composite samples, are given in Table 3.

EXAMPLE 4

Brine solutions containing 1.5 ppb of HEC were formulated by mixing various ratios of the solutions shown in Table 3. API rheology was then obtained on the solutions. The solutions were then mixed with 3 ppg of BARACARB (tradename of a $CaCO_3$ bridging agent marketed by NL Baroid, Houston, Tex.), and the API rheology and API fluid loss obtained on the solutions after rolling for 16 hours at 150° F. and cooling to room temperature. The data are given in Tables 4 and 5.

TABLE 3

| Composition of Solution | | | | 1.5 ppb. Natrosol 250 HHR | | | | | | |
|---|---|---|---|---|---|---|---|---|---|---|
| | | | | Initial API RHEOLOGY | | | After Rolling 16 Hours @ 150° F. API RHEOLOGY | | | API (1) Fluid |
| % $ZnBr_2$ | % $CaCl_2$ | % $CaBr_2$ | Density ppg. | 600 | 300 | 3 | 600 | 300 | 3 | Loss |
| 57 | 0 | 20 | 19.2 | 278 | 196 | 31 | 262 | 188 | 24 | 17.5 |
| 57 | 0 | 20 | 19.2 | 270 | 190 | 31 | 251 | 179 | 24 | |
| 0 | 37.6 | 0 | 11.6 | 160 | 118 | 17 | 147 | 106 | 10 | 38.5 |
| 0 | 37.6 | 0 | 11.6 | 158 | 116 | 16 | 143 | 103 | 10 | |
| 0 | 0 | 53 | 14.2 | 155 | 115 | 19 | 152 | 113 | 16 | 17.5 |
| 0 | 0 | 53 | 14.2 | 154 | 115 | 18 | 158 | 117 | 16 | |

Sample After Rolling with 3 ppb. BARACARB Added.

TABLE 4

| Composition of Solution | | | | | | | 1.5 ppb. Natrosol 250 HHR API RHEOLOGY | | | | | | (1) |
|---|---|---|---|---|---|---|---|---|---|---|---|---|---|
| % $ZnBr_2$ | % $CaCl_2$ | % $CaBr_2$ | Density ppg. | 19.2 ppg. bbl. | 11.6 ppg. bbl. | 14.2 ppg. bbl. | Initial | | | After Rolling 16 Hours @ 150° F. | | | API Fluid Loss |
| | | | | | | | 600 | 300 | 3 | 600 | 300 | 3 | |
| 18 | 0 | 42.5 | 15.5 | 0.255 | 0 | 0.745 | 35 | 19 | 1 | 37 | 20 | 1 | 7.2 |
| | 2 | 39.8 | 15.3 | 0.251 | 0.070 | 0.679 | 27 | 14 | 1 | 32 | 17 | 1 | 2.6 |
| | 4 | 36.9 | 15.1 | 0.248 | 0.139 | 0.613 | 30 | 15 | 1 | 29 | 15 | 1 | 8.2 |
| | 6 | 34.1 | 14.9 | 0.245 | 0.205 | 0.550 | 27 | 14 | 1 | 27 | 14 | 1 | 9.0 |
| | 8 | 31.3 | 14.7 | 0.242 | 0.270 | 0.488 | 25 | 13 | 1 | 23 | 12 | 0 | 5.4 |
| | 10 | 28.5 | 14.5 | 0.239 | 0.334 | 0.427 | 23 | 12 | 1 | 30 | 16 | 1 | 5.0 |
| 20 | 0 | 41.4 | 15.6 | 0.286 | 0 | 0.714 | 139 | 100 | 11 | 139 | 101 | 12 | 4 |
| | 2 | 38.6 | 15.4 | 0.282 | 0.071 | 0.647 | 137 | 100 | 9 | 131 | 93 | 7 | 2 |
| | 4 | 35.8 | 15.2 | 0.278 | 0.140 | 0.582 | 134 | 97 | 8 | 121 | 84 | 4 | 3 |
| | 6 | 32.9 | 15.0 | 0.275 | 0.207 | 0.518 | 127 | 89 | 7 | 96 | 62 | 2 | 3 |
| | 8 | 30.1 | 14.8 | 0.271 | 0.273 | 0.456 | 105 | 70 | 3 | 53 | 30 | 1 | 0.5 |
| | 10 | 27.3 | 14.7 | 0.269 | 0.337 | 0.394 | 77 | 47 | 2 | 45 | 25 | 1 | 1.5 |
| | 12 | 24.5 | 14.5 | 0.264 | 0.399 | 0.337 | 24 | 13 | 1 | 26 | 13 | 0 | 3.5 |
| | 14 | 21.3 | 14.3 | 0.261 | 0.460 | 0.279 | 24 | 13 | 1 | 26 | 14 | 1 | 4.4 |
| 22 | 0 | 40.3 | 15.8 | 0.317 | 0 | 0.683 | 158 | 116 | 19 | 150 | 111 | 18 | 8 |
| | 2 | 37.5 | 15.6 | 0.313 | 0.071 | 0.616 | 147 | 109 | 13 | 148 | 109 | 15 | 5 |
| | 4 | 34.7 | 15.4 | 0.309 | 0.140 | 0.551 | 146 | 108 | 13 | 142 | 105 | 14 | 8 |
| | 6 | 31.8 | 15.2 | 0.305 | 0.210 | 0.485 | 138 | 100 | 10 | 131 | 95 | 10 | 1.8 |
| | 8 | 28.9 | 15.0 | 0.302 | 0.276 | 0.422 | 145 | 105 | 13 | 137 | 99 | 13 | 1.8 |
| | 10 | 26.1 | 14.8 | 0.298 | 0.340 | 0.362 | 137 | 99 | 12 | 133 | 97 | 11 | 1.8 |
| | 12 | 23.3 | 14.6 | 0.294 | 0.403 | 0.303 | 90 | 59 | 3 | 54 | 30 | 1 | 1.2 |
| | 14 | 20.6 | 14.4 | 0.290 | 0.463 | 0.247 | 34 | 18 | 1 | 36 | 19 | 1 | 2.2 |
| 24 | 0 | 39.1 | 15.9 | 0.349 | 0 | 0.651 | 169 | 124 | 20 | 166 | 123 | 18 | 21 |
| | 2 | 36.3 | 15.7 | 0.345 | 0.072 | 0.583 | 156 | 116 | 17 | 158 | 117 | 17 | 10 |
| | 4 | 33.4 | 15.5 | 0.341 | 0.143 | 0.516 | 149 | 110 | 15 | 152 | 112 | 14 | 9 |
| | 6 | 30.6 | 15.3 | 0.336 | 0.212 | 0.452 | 150 | 111 | 15 | 154 | 114 | 15 | 15 |
| | 8 | 27.8 | 15.1 | 0.333 | 0.278 | 0.389 | 146 | 107 | 14 | 150 | 111 | 14 | 15 |
| | 10 | 25.0 | 15.0 | 0.328 | 0.343 | 0.329 | 147 | 107 | 14 | 148 | 109 | 14 | 12 |
| | 12 | 22.2 | 14.8 | 0.324 | 0.406 | 0.270 | 144 | 105 | 14 | 146 | 107 | 13 | 8 |
| | 14 | 19.4 | 14.6 | 0.320 | 0.468 | 0.212 | 140 | 102 | 13 | 142 | 104 | 13 | 8 |
| | 16 | 16.6 | 14.4 | 0.316 | 0.528 | 0.156 | 137 | 98 | 12 | 141 | 102 | 12 | 7 |
| 26 | 0 | 38.0 | 16.1 | 0.381 | 0 | 0.619 | 176 | 129 | 21 | 167 | 121 | 17 | 27 |
| | 2 | 35.2 | 15.9 | 0.377 | 0.073 | 0.550 | 162 | 120 | 18 | 162 | 120 | 17 | 22 |
| | 4 | 32.3 | 15.7 | 0.373 | 0.143 | 0.484 | 159 | 118 | 17 | 159 | 117 | 16 | 14 |
| | 6 | 29.5 | 15.5 | 0.368 | 0.214 | 0.418 | 156 | 115 | 17 | 158 | 117 | 17 | 8 |
| | 8 | 26.7 | 15.3 | 0.363 | 0.281 | 0.356 | 152 | 112 | 16 | 155 | 114 | 16 | 6 |
| | 10 | 23.7 | 15.1 | 0.359 | 0.348 | 0.293 | 147 | 108 | 15 | 153 | 113 | 16 | 5 |
| | 12 | 21.1 | 14.9 | 0.354 | 0.409 | 0.237 | 146 | 107 | 14 | 152 | 112 | 14 | 10 |
| | 14 | 18.3 | 14.7 | 0.350 | 0.471 | 0.179 | 145 | 106 | 14 | 147 | 108 | 14 | 11 |
| | 16 | 15.4 | 14.5 | 0.346 | 0.533 | 0.121 | 152 | 111 | 16 | 142 | 104 | 13 | 13 |
| 28 | 14 | 17.1 | 14.9 | 0.380 | 0.477 | 0.143 | 168 | 123 | 19 | 149 | 110 | 16 | 12 |
| | 16 | 14.1 | 14.7 | 0.376 | 0.541 | 0.083 | 170 | 124 | 19 | 153 | 112 | 14 | 13 |
| | 18 | 11.1 | 14.5 | 0.372 | 0.605 | 0.023 | 163 | 120 | 17 | 151 | 110 | 15 | 17 |

TABLE 4-continued

| Composition of Solution | | | | | | | 1.5 ppb. Natrosol 250 HHR | | | | | | (1) |
|---|---|---|---|---|---|---|---|---|---|---|---|---|---|
| | | | | | | | API RHEOLOGY | | | | | | |
| % | % | % | Density | 19.2 ppg. | 11.6 ppg. | 14.2 ppg. | Initial | | | After Rolling 16 Hours @ 150° F. | | | API Fluid |
| $ZnBr_2$ | $CaCl_2$ | $CaBr_2$ | ppg. | bbl. | bbl. | bbl. | 600 | 300 | 3 | 600 | 300 | 3 | Loss |
| 30 | 14 | 15.9 | 15.0 | 0.411 | 0.481 | 0.108 | 173 | 127 | 20 | 162 | 119 | 17 | 18 |

(1) Sample After Rolling with 3 ppb. BARACARB Added.

TABLE 5

| Composition of Solution | | | | | | | 1.5 ppb. Natrosol 250 HHR | | | | | | (1) |
|---|---|---|---|---|---|---|---|---|---|---|---|---|---|
| | | | | | | | API RHEOLOGY | | | | | | |
| % | % | % | Density | 19.2 ppg. | 11.6 ppg. | 14.2 ppg. | Initial | | | After Rolling 16 Hours @ 150° F. | | | API Fluid |
| $ZnBr_2$ | $CaCl_2$ | $CaBr_2$ | ppg. | bbl. | bbl. | bbl. | 600 | 300 | 3 | 600 | 300 | 3 | Loss |
| 18 | 0 | 42.5 | 15.5 | 0.255 | 0 | 0.745 | 35 | 19 | 1 | 37 | 20 | 1 | 7.2 |
| 20 | | 41.4 | 15.6 | 0.286 | 0 | 0.714 | 139 | 100 | 11 | 139 | 101 | 12 | 4 |
| 22 | | 40.3 | 15.8 | 0.317 | 0 | 0.683 | 158 | 116 | 19 | 150 | 111 | 18 | 8 |
| 24 | | 39.1 | 15.9 | 0.349 | 0 | 0.651 | 169 | 124 | 20 | 166 | 123 | 18 | 21 |
| 26 | | 38.0 | 16.1 | 0.381 | 0 | 0.619 | 176 | 129 | 21 | 167 | 121 | 17 | 27 |
| 18 | 2 | 39.8 | 15.3 | 0.251 | 0.070 | 0.679 | 27 | 14 | 1 | 32 | 17 | 1 | 2.6 |
| 20 | | 38.6 | 15.4 | 0.282 | 0.071 | 0.647 | 137 | 100 | 9 | 131 | 93 | 7 | 2 |
| 22 | | 37.5 | 15.6 | 0.313 | 0.071 | 0.616 | 147 | 109 | 13 | 148 | 109 | 15 | 5 |
| 24 | | 36.3 | 15.7 | 0.345 | 0.072 | 0.583 | 156 | 116 | 17 | 158 | 117 | 17 | 10 |
| 26 | | 35.2 | 15.9 | 0.377 | 0.073 | 0.550 | 162 | 120 | 18 | 162 | 120 | 17 | 22 |
| 18 | 4 | 36.9 | 15.1 | 0.248 | 0.139 | 0.613 | 30 | 15 | 1 | 29 | 15 | 1 | 8.2 |
| 20 | | 35.8 | 15.2 | 0.278 | 0.140 | 0.582 | 134 | 97 | 8 | 121 | 84 | 4 | 3 |
| 22 | | 34.7 | 15.4 | 0.309 | 0.140 | 0.551 | 146 | 108 | 13 | 142 | 105 | 14 | 8 |
| 24 | | 33.4 | 15.5 | 0.341 | 0.143 | 0.516 | 149 | 110 | 15 | 152 | 112 | 14 | 9 |
| 26 | | 32.3 | 15.7 | 0.373 | 0.143 | 0.484 | 159 | 118 | 17 | 159 | 117 | 16 | 14 |
| 18 | 6 | 34.1 | 14.9 | 0.245 | 0.205 | 0.550 | 27 | 14 | 1 | 27 | 14 | 1 | 9 |
| 20 | | 32.9 | 15.0 | 0.275 | 0.207 | 0.518 | 127 | 89 | 7 | 96 | 62 | 2 | 3 |
| 22 | | 31.8 | 15.2 | 0.305 | 0.210 | 0.485 | 138 | 100 | 10 | 131 | 95 | 10 | 1.8 |
| 24 | | 30.6 | 15.3 | 0.336 | 0.212 | 0.452 | 150 | 111 | 15 | 154 | 114 | 5 | 15 |
| 26 | | 29.5 | 15.5 | 0.368 | 0.214 | 0.418 | 156 | 115 | 17 | 158 | 117 | 17 | 8 |
| 18 | 8 | 31.3 | 14.7 | 0.242 | 0.270 | 0.488 | 25 | 13 | 1 | 23 | 12 | 0 | 5.4 |
| 20 | | 30.1 | 14.8 | 0.271 | 0.273 | 0.456 | 105 | 70 | 3 | 53 | 30 | 1 | 0.5 |
| 22 | | 28.9 | 15.0 | 0.302 | 0.276 | 0.422 | 145 | 105 | 13 | 137 | 99 | 13 | 1.8 |
| 24 | | 27.8 | 15.1 | 0.333 | 0.278 | 0.389 | 146 | 107 | 14 | 150 | 111 | 14 | 15 |
| 26 | | 26.7 | 15.3 | 0.363 | 0.281 | 0.356 | 152 | 112 | 16 | 155 | 114 | 16 | 6 |
| 18 | 10 | 28.5 | 14.5 | 0.239 | 0.334 | 0.427 | 23 | 12 | 1 | 30 | 16 | 1 | 5 |
| 20 | | 27.3 | 14.7 | 0.269 | 0.337 | 0.394 | 77 | 47 | 2 | 45 | 25 | 1 | 1.5 |
| 22 | | 26.1 | 14.8 | 0.298 | 0.340 | 0.362 | 137 | 99 | 12 | 133 | 97 | 11 | 1.8 |
| 24 | | 25.0 | 15.0 | 0.328 | 0.343 | 0.329 | 147 | 107 | 14 | 148 | 109 | 14 | 12 |
| 26 | | 23.7 | 15.1 | 0.359 | 0.348 | 0.293 | 147 | 108 | 15 | 153 | 113 | 16 | 5 |
| 20 | 12 | 24.5 | 14.5 | 0.264 | 0.399 | 0.337 | 24 | 13 | 1 | 26 | 13 | 0 | 3.5 |
| 22 | | 23.3 | 14.6 | 0.294 | 0.403 | 0.303 | 90 | 59 | 3 | 54 | 30 | 1 | 1.2 |
| 24 | | 22.2 | 14.8 | 0.324 | 0.406 | 0.270 | 144 | 105 | 14 | 146 | 107 | 13 | 8 |
| 26 | | 21.1 | 14.9 | 0.354 | 0.409 | 0.237 | 146 | 107 | 14 | 152 | 112 | 14 | 10 |
| 20 | 14 | 21.7 | 14.3 | 0.261 | 0.460 | 0.279 | 24 | 13 | 1 | 26 | 14 | 1 | 4.4 |
| 22 | | 20.6 | 14.5 | 0.290 | 0.463 | 0.247 | 34 | 18 | 1 | 36 | 19 | 1 | 2.2 |
| 24 | | 19.4 | 14.6 | 0.320 | 0.468 | 0.212 | 140 | 102 | 13 | 142 | 104 | 13 | 8 |
| 26 | | 18.3 | 14.7 | 0.350 | 0.471 | 0.179 | 145 | 106 | 14 | 147 | 108 | 14 | 1 |
| 28 | | 17.1 | 14.9 | 0.380 | 0.477 | 0.143 | 168 | 123 | 19 | 149 | 110 | 16 | 12 |
| 30 | | 15.9 | 15.0 | 0.411 | 0.481 | 0.108 | 173 | 127 | 20 | 162 | 119 | 17 | 18 |
| 24 | 16 | 16.6 | 14.4 | 0.316 | 0.528 | 0.156 | 137 | 98 | 12 | 141 | 102 | 12 | 7 |
| 26 | | 15.4 | 14.5 | 0.346 | 0.533 | 0.121 | 152 | 111 | 16 | 142 | 104 | 13 | 13 |
| 28 | | 14.1 | 14.7 | 0.376 | 0.541 | 0.083 | 170 | 124 | 19 | 153 | 112 | 14 | 13 |
| 28 | 18 | 11.1 | 14.5 | 0.372 | 0.605 | 0.023 | 163 | 120 | 17 | 151 | 110 | 15 | 17 |

(1) Sample After Rolling with 3 ppb. BARACARB Added.

As can be seen from the data in Tables 4 and 5, to be compatible with HEC, the brine solutions must contain at least about 20% $ZnBr_2$ and no more than about $(2x-33)$% calcium chloride where x is the concentration of $ZnBr_2$. As further seen, fluid loss increases with increasing $ZnBr_2$ concentration and decrease with increasing $CaCl_2$ concentration.

EXAMPLE 5

Various brine solutions were prepared by mixing together various aqueous salt solutions and, in some cases, solid. Thereafter, the activated HEC used in Example 4 was added to the brine solution to produce a concentration of 1.5 ppb HEC and the solutions mixed for 5 minutes on a Multimixer. The solutions were then rolled 55 minutes at room temperature and the API rheology obtained. After rolling 16 hours at 150° F., cooling to room temperature and mixing 5 minutes on a Multimixer, API rheology and API fluid loss were obtained (the latter after adding 3 ppb BARACARB). The data obtained, together with comparison data from Table 2, are given in Tables 6-8.

TABLE 6

| | COMPOSITION OF SOLUTION | | | | | | | 1.5 ppb. Natrosol 250 HHR API RHEOLOGY *** | | | | | | API Fluid Loss ** |
|---|---|---|---|---|---|---|---|---|---|---|---|---|---|---|
| Density ppg. | % ZnBr₂ | % CaCl₂ | % CaBr₂ | 19.2 bbl. | 11.6 bbl. | 14.2 bbl. | 95% CaCl₂ lb. | After One Hour @ 74° F. 600 | 300 | 3 | After Rolling Overnight @ 150° F. 600 | 300 | 3 | *** |
|---|---|---|---|---|---|---|---|---|---|---|---|---|---|---|
| 14.5 | 24 | 18.6 | 14.8 | 0.318 | 0.544 | 0.123 | 14.5 | 51 | 28 | 1 | 102 | 59 | 2 | 0 |
| 14.5 | 26 | 18.6 | 12.8 | 0.3445 | 0.575 | 0.072 | 8.5 | 91 | 57 | 3 | 143 | 100 | 14 | 1.8 |
| 14.5 | 24 | 14.9 | 18.1 | 0.318 | 0.496 | 0.186 | 0 | 75 | 47 | 2 | 134 | 90 | 12 | 2.0 |
| 14.5 | 26 | 16.6 | 14.5 | 0.3445 | 0.552 | 0.1035 | 0 | (83) | (53) | (3) | (137) | (96) | (14) | (3.2) |
| 14.5 | 28 | 18.6 | 10.9 | 0.371 | 0.6056 | 0.021 | 2.5 | 93 | 59 | 3 | 154 | 107 | 15 | 4.2 |
| 14.5 | 28 | 18.0 | 11.5 | 0.371 | 0.5975 | 0.0315 | 0 | 91 | 58 | 3 | 145 | 100 | 14 | 3.4 |
| 14.5 | 28.8 | 18.6 | 10.1 | 0.3815 | 0.6185 | 0 | 0 | 99 | 65 | 4 | 151 | 106 | 15 | 4.8 |
| 15.0 | 24 | 16.1 | 19.9 | 0.329 | 0.414 | 0.228 | 27.0 | 41 | 21 | 0 | 73 | 38 | 1 | 0.1 |
| 15.0 | 26 | 16.1 | 18.0 | 0.356 | 0.445 | 0.177 | 20.9 | (62) | (35) | (1) | (159) | (125) | (20) | (0.7) |
| 15.0 | 28 | 16.1 | 16.0 | 0.384 | 0.479 | 0.122 | 14.4 | 73 | 43 | 1 | 152 | 109 | 16 | 2.6 |
| 15.0 | 24 | 9.5 | 25.8 | 0.329 | 0.325 | 0.346 | 0 | 82 | 51 | 3 | 148 | 104 | 17 | 1.2 |
| 15.0 | 26 | 10.9 | 22.5 | 0.356 | 0.3765 | 0.2675 | 0 | (102) | (71) | (4) | (156) | (111) | (19) | (5.0) |
| 15.0 | 30 | 16.1 | 14.0 | 0.411 | 0.510 | 0.070 | 8.3 | 89 | 57 | 3 | 179 | 127 | 21 | 3.8 |
| 15.0 | 28 | 12.5 | 12.5 | 0.384 | 0.431 | 0.185 | 0 | 98 | 64 | 4 | 132 | 95 | 12 | 6.0 |
| 15.0 | 32 | 16.1 | 12.1 | 0.4385 | 0.542 | 0.017 | 2.0 | 140 | 91 | 9 | 191 | 138 | 23 | 5.0 |
| 15.0 | 32.6 | 16.1 | 11.5 | 0.4474 | 0.5526 | 0 | 0 | 128 | 87 | 9 | 175 | 124 | 20 | 95 |
| 15.5 | 24 | 13.9 | 24.6 | 0.340 | 0.285 | 0.334 | 40.1 | 45 | 23 | 1 | 73 | 38 | 2 | 0 |
| 15.5 | 26 | 13.9 | 22.8 | 0.368 | 0.316 | 0.281 | 33.8 | (68) | (40) | (2) | (190) | (143) | (19) | (4.0) |
| 15.5 | 28 | 13.7 | 20.7 | 0.3965 | 0.350 | 0.225 | 26.6 | 95 | 58 | 3 | 160 | 148 | 23 | 6.0 |
| 15.5 | 24 | 4.4 | 32.9 | 0.340 | 0.155 | 0.505 | 0 | 92 | 59 | 3 | 140 | 118 | 22 | 1.4 |
| 15.5 | 30 | 13.7 | 18.8 | 0.425 | 0.383 | 0.171 | 20.2 | (103) | (66) | (3) | (184) | (146) | (26) | (24) |
| 15.5 | 26 | 5.8 | 29.8 | 0.368 | 0.2065 | 0.4255 | 0 | (106) | (71) | (4) | (160) | (118) | (21) | (7.5) |
| 15.5 | 28 | 7.4 | 26.4 | 0.3965 | 0.262 | 0.3415 | 0 | 105 | 70 | 5 | 149 | 109 | 17 | 5.6 |
| 15.5 | 32 | 13.7 | 16.9 | 0.453 | 0.416 | 0.117 | 13.8 | (124) | (82) | (6) | (193) | (140) | (26) | (23) |
| 15.5 | 34 | 14.9 | 0.4815 | 0.450 | 0.0605 | 7.2 | 127 | 82 | 7 | 185 | 135 | 21 | 11 |
| 15.5 | 36.2 | 13.7 | 12.7 | 0.513 | 0.487 | 0 | 0 | 162 | 111 | 15 | 185 | 135 | 22 | 10 |
| 16.0 | 24.6 | 11.7 | 28.5 | 0.360 | 0.165 | 0.4225 | 50.6 | 91 | 52 | 1 | 132 | 73 | 2 | 0 |
| 16.0 | 26 | 11.6 | 27.2 | 0.380 | 0.188 | 0.384 | 46.0 | (65) | (36) | (1) | (197) | (149) | (17) | (2.0) |
| 16.0 | 28 | 11.6 | 25.3 | 0.409 | 0.221 | 0.329 | 39.4 | 80 | 46 | 2 | 144 | 130 | 14 | 4.0 |
| 16.0 | 30 | 11.6 | 23.3 | 0.4385 | 0.257 | 0.271 | 32.6 | 90 | 54 | 2 | 180 | 138 | 19 | 11.4 |
| 16.0 | 24.6 | 0 | 38.7 | 0.360 | 0 | 0.640 | 0 | 135 | 91 | 11 | 166 | 120 | 24 | 13 |
| 16.0 | 32 | 11.5 | 21.3 | 0.468 | 0.292 | 0.2135 | 25.2 | 90 | 55 | 3 | 220 | 156 | 25 | |
| 16.0 | 26 | 1.0 | 36.5 | 0.380 | 0.038 | 0.582 | 0 | 113 | 76 | 6 | 167 | 123 | 22 | 57 |
| 16.0 | 28 | 2.5 | 33.2 | 0.409 | 0.093 | 0.498 | 0 | 129 | 88 | 8 | 175 | 127 | 23 | 36 |
| 16.0 | 34 | 11.5 | 21.3 | 0.497 | 0.325 | 0.158 | 18.7 | 94 | 59 | 3 | 202 | 146 | 25 | 21 |
| 16.0 | 39.6 | 11.5 | 13.9 | 0.579 | 0.421 | 0 | 0 | (168) | (116) | (16) | (184) | (135) | (23) | (35) |

**Sample after rolling overnight at 150° F. with 3 ppb BARACARB added.
***Data in parentheses are the average of two separate sample evaluations.

TABLE 7

| | COMPOSITION OF SOLUTION | | | | | | | 1.5 ppb. Natrosol 250 HHR API RHEOLOGY *** | | | | | | API Fluid Loss ** |
|---|---|---|---|---|---|---|---|---|---|---|---|---|---|---|
| Density ppg. | % ZnBr₂ | % CaCl₂ | % CaBr₂ | 19.2 bbl. | 11.6 bbl. | 14.2 bbl. | 95% CaCl₂ lb. | After One Hour @ 74° F. 600 | 300 | 3 | After Rolling Overnight @ 150° F. 600 | 300 | 3 | *** |
|---|---|---|---|---|---|---|---|---|---|---|---|---|---|---|
| 16.0 | 24.6 | 0 | 38.7 | 0.360 | 0 | 0.640 | 0 | 135 | 91 | 11 | 166 | 120 | 24 | 13 |
| 15.5 | 24 | 4.4 | 32.9 | 0.340 | 0.155 | 0.505 | 0 | 92 | 59 | 3 | 140 | 118 | 22 | 1.4 |
| 15.0 | 24 | 9.5 | 25.8 | 0.329 | 0.325 | 0.346 | 0 | 82 | 51 | 3 | 148 | 104 | 17 | 1.2 |
| 14.5 | 24 | 14.9 | 18.1 | 0.318 | 0.496 | 0.186 | 0 | 75 | 47 | 2 | 134 | 90 | 12 | 2.0 |
| 16.0 | 24.6 | 11.7 | 28.5 | 0.360 | 0.165 | 0.4225 | 50.6 | 91 | 52 | 1 | 132 | 73 | 2 | 0 |
| 15.5 | 24 | 13.9 | 24.6 | 0.340 | 0.285 | 0.334 | 40.1 | 45 | 23 | 1 | 73 | 38 | 2 | 0 |
| 15.0 | 24 | 16.1 | 19.9 | 0.329 | 0.414 | 0.228 | 27.0 | 41 | 21 | 1 | 73 | 38 | 1 | 0.1 |
| 14.5 | 24 | 18.6 | 14.8 | 0.318 | 0.544 | 0.123 | 14.5 | 51 | 28 | 1 | 102 | 59 | 2 | 0 |
| 16.0 | 26 | 1.0 | 36.5 | 0.380 | 0.038 | 0.582 | 0 | 113 | 76 | 6 | 167 | 123 | 22 | 57 |
| 15.5 | 26 | 5.8 | 29.8 | 0.368 | 0.2065 | 0.4255 | 0 | (106) | (71) | (4) | (160) | (118) | (21) | (7.5) |
| 15.0 | 26 | 10.9 | 22.5 | 0.356 | 0.3765 | 0.2675 | 0 | (102) | (71) | (4) | (156) | (111) | (19) | (5.0) |
| 14.5 | 26 | 16.6 | 14.5 | 0.3445 | 0.552 | 0.1035 | 0 | (83) | (53) | (3) | (137) | (96) | (14) | (3.2) |
| 16.0 | 26 | 11.6 | 27.2 | 0.380 | 0.188 | 0.384 | 46.0 | (65) | (36) | (1) | (197) | (149) | (17) | (2.0) |
| 15.5 | 26 | 13.9 | 22.8 | 0.368 | 0.316 | 0.281 | 35.8 | (68) | (40) | (2) | (190) | (143) | (19) | (4.0) |
| 15.0 | 26 | 16.1 | 18.0 | 0.356 | 0.445 | 0.177 | 20.9 | (62) | (35) | (1) | (159) | (125) | (20) | (0.7) |
| 14.5 | 26 | 18.6 | 12.8 | 0.3445 | 0.575 | 0.072 | 8.5 | 91 | 57 | 3 | 143 | 100 | 14 | 1.8 |
| 16.0 | 28 | 2.5 | 33.2 | 0.409 | 0.093 | 0.498 | 0 | 129 | 88 | 8 | 175 | 127 | 23 | 36 |
| 15.5 | 28 | 7.4 | 26.4 | 0.3965 | 0.262 | 0.3415 | 0 | 105 | 70 | 5 | 149 | 109 | 17 | 5.6 |
| 16.0 | 28 | 11.6 | 25.3 | 0.409 | 0.221 | 0.329 | 39.4 | 80 | 46 | 2 | 144 | 130 | 14 | 4.0 |
| 15.0 | 28 | 12.5 | 19.1 | 0.384 | 0.431 | 0.185 | 0 | 98 | 64 | 4 | 132 | 95 | 12 | 6.0 |
| 15.5 | 28 | 13.7 | 20.7 | 0.3965 | 0.350 | 0.225 | 26.6 | 95 | 58 | 3 | 160 | 148 | 23 | 6.0 |
| 15.0 | 28 | 16.1 | 16.0 | 0.384 | 0.479 | 0.122 | 14.4 | 73 | 43 | 1 | 152 | 109 | 16 | 2.6 |
| 14.5 | 28 | 18.0 | 11.5 | 0.371 | 0.5975 | 0.0315 | 0 | 91 | 58 | 3 | 145 | 100 | 14 | 3.4 |
| 14.5 | 28 | 18.6 | 10.9 | 0.371 | 0.6056 | 0.021 | 2.5 | 93 | 59 | 3 | 154 | 107 | 15 | 4.2 |
| 14.5 | 28.8 | 18.6 | 10.1 | 0.3815 | 0.6185 | 0 | 0 | 99 | 65 | 4 | 151 | 106 | 15 | 4.8 |
| 16.0 | 30 | 11.6 | 23.3 | 0.4385 | 0.257 | 0.271 | 32.6 | 90 | 54 | 2 | 180 | 138 | 19 | 11 |

TABLE 7-continued

| COMPOSITION OF SOLUTION | | | | | | | 1.5 ppb. Natrosol 250 HHR | | | | | | API Fluid Loss ** *** |
|---|---|---|---|---|---|---|---|---|---|---|---|---|---|
| | | | | | | | API RHEOLOGY *** | | | | | | |
| | | | | | | 95% | After One Hour @ 74° F. | | | After Rolling Overnight @ 150° F. | | | |
| Density ppg. | % ZnBr$_2$ | % CaCl$_2$ | % CaBr$_2$ | 19.2 bbl. | 11.6 bbl. | 14.2 bbl. | CaCl$_2$ lb. | 600 | 300 | 3 | 600 | 300 | 3 |
| 15.5 | 30 | 13.7 | 18.8 | 0.425 | 0.383 | 0.171 | 20.2 | (103) | (66) | (3) | (184) | (146) | (26) | (24) |
| 15.0 | 30 | 16.1 | 14.0 | 0.411 | 0.510 | 0.070 | 8.3 | 89 | 57 | 3 | 179 | 127 | 21 | 3.8 |
| 16.0 | 32 | 11.5 | 21.3 | 0.468 | 0.292 | 0.2135 | 25.2 | 90 | 55 | 3 | 220 | 156 | 25 | 22 |
| 15.5 | 32 | 13.7 | 16.9 | 0.453 | 0.416 | 0.117 | 13.8 | (124) | (82) | (6) | (193) | (140) | (26) | (23) |
| 15.0 | 32 | 16.1 | 12.1 | 0.4385 | 0.542 | 0.017 | 2.0 | 140 | 91 | 9 | 191 | 138 | 23 | 5.0 |
| 15.0 | 32.6 | 16.1 | 11.5 | 0.4474 | 0.5526 | 0 | 0 | 128 | 87 | 9 | 175 | 124 | 20 | 95 |
| 16.0 | 34 | 11.5 | 19.4 | 0.497 | 0.325 | 0.158 | 18.7 | 94 | 59 | 3 | 202 | 146 | 25 | 21 |
| 15.5 | 34 | 13.7 | 14.9 | 0.4815 | 0.450 | 0.605 | 7.2 | 127 | 82 | 7 | 185 | 135 | 21 | 11 |
| 15.5 | 36.2 | 13.7 | 12.7 | 0.513 | 0.487 | 0 | 0 | 162 | 111 | 15 | 185 | 135 | 22 | 10 |
| 16.0 | 39.6 | 11.5 | 13.9 | 0.579 | 0.421 | 0 | 0 | (168) | (116) | (16) | (184) | (135) | (23) | (35) |

**Sample after rolling overnight at 150° F. with 3 ppb. BARACARB added.
***Data in parentheses are the average of two separate sample evaluations.

TABLE 8

| COMPOSITION OF SOLUTION | | | | | | | 1.5 ppb. Natrosol 250 HHR | | | | | | API Fluid Loss ** *** |
|---|---|---|---|---|---|---|---|---|---|---|---|---|---|
| | | | | | | | API RHEOLOGY *** | | | | | | |
| | | | | | | 95% | After One Hour @ 74° F. | | | After Rolling Overnight @ 150° F. | | | |
| Density ppg. | % ZnBr$_2$ | % CaCl$_2$ | % CaBr$_2$ | 19.2 bbl. | 11.6 bbl. | 14.2 bbl. | CaCl$_2$ lb. | 600 | 300 | 3 | 600 | 300 | 3 |
| 16.0 | 24.6 | 11.7 | 28.5 | 0.360 | 0.165 | 0.4225 | 50.6 | 91 | 52 | 1 | 132 | 73 | 2 | 0 |
| 16.0 | 26 | 11.6 | 27.2 | 0.380 | 0.188 | 0.384 | 46.0 | (65) | (36) | (1) | (197) | (149) | (17) | (2.0) |
| 16.0 | 28 | 11.6 | 25.3 | 0.409 | 0.221 | 0.329 | 39.4 | 80 | 46 | 2 | 144 | 130 | 14 | 4.0 |
| 16.0 | 30 | 11.6 | 23.3 | 0.4385 | 0.257 | 0.271 | 32.6 | 90 | 54 | 2 | 180 | 138 | 19 | 11 |
| 16.0 | 32 | 11.5 | 21.3 | 0.468 | 0.292 | 0.2135 | 25.2 | 90 | 55 | 3 | 220 | 156 | 25 | 22 |
| 16.0 | 34 | 11.5 | 19.4 | 0.497 | 0.325 | 0.158 | 18.7 | 94 | 59 | 3 | 202 | 146 | 25 | 21 |
| 16.0 | 39.6 | 11.5 | 14.9 | 0.579 | 0.421 | 0 | 0 | (168) | (116) | (16) | (184) | (135) | (23) | (35) |
| 15.5 | 24 | 13.9 | 24.6 | 0.340 | 0.285 | 0.334 | 40.1 | 45 | 23 | 1 | 73 | 38 | 2 | 0 |
| 15.5 | 26 | 13.9 | 22.8 | 0.368 | 0.316 | 0.281 | 33.8 | (68) | (40) | (2) | (190) | (143) | (19) | (4.0) |
| 15.5 | 28 | 13.7 | 20.7 | 0.3965 | 0.350 | 0.225 | 26.6 | 95 | 58 | 3 | 160 | 148 | 23 | 6.0 |
| 15.5 | 30 | 13.7 | 18.8 | 0.425 | 0.383 | 0.171 | 20.2 | (103) | (66) | (3) | (184) | (146) | (26) | (24) |
| 15.5 | 32 | 13.7 | 16.9 | 0.453 | 0.416 | 0.117 | 13.8 | (124) | (82) | (6) | (193) | (140) | (26) | (23) |
| 15.5 | 34 | 13.7 | 14.9 | 0.4815 | 0.450 | 0.605 | 7.2 | 127 | 82 | 7 | 185 | 135 | 21 | 11 |
| 15.5 | 36.2 | 13.7 | 12.7 | 0.513 | 0.487 | 0 | 0 | 162 | 111 | 15 | 185 | 135 | 22 | 10 |
| 15.0 | 24 | 16.1 | 19.9 | 0.329 | 0.414 | 0.228 | 27.8 | 41 | 21 | 0 | 73 | 38 | 1 | 0.1 |
| 15.0 | 26 | 16.1 | 18.0 | 0.356 | 0.445 | 0.177 | 20.9 | (62) | (35) | (1) | (159) | (125) | (20) | (0.7) |
| 15.0 | 28 | 16.1 | 16.0 | 0.384 | 0.479 | 0.122 | 14.4 | 73 | 43 | 1 | 15.2 | 109 | 16 | 2.6 |
| 15.0 | 30 | 16.1 | 14.0 | 0.411 | 0.510 | 0.070 | 8.3 | 89 | 57 | 3 | 179 | 127 | 21 | 3.8 |
| 15.0 | 32 | 16.1 | 12.1 | 0.4385 | 0.542 | 0.017 | 2.0 | 140 | 91 | 9 | 191 | 138 | 23 | 5.0 |
| 15.0 | 32.6 | 16.1 | 11.5 | 0.4474 | 0.5526 | 0 | 0 | 128 | 87 | 9 | 175 | 124 | 20 | 95 |
| 14.5 | 24 | 18.6 | 14.8 | 0.318 | 0.544 | 0.123 | 14.5 | 51 | 28 | 1 | 102 | 59 | 2 | 0 |
| 14.5 | 26 | 18.6 | 12.8 | 0.3445 | 0.575 | 0.072 | 8.5 | 91 | 57 | 3 | 143 | 100 | 14 | 1.8 |
| 14.5 | 28 | 18.6 | 10.9 | 0.371 | 0.6056 | 0.021 | 2.5 | 93 | 59 | 3 | 154 | 107 | 15 | 4.2 |
| 14.5 | 28.8 | 18.6 | 10.1 | 0.3815 | 0.6185 | 0 | 0 | 99 | 65 | 4 | 151 | 106 | 15 | 4.8 |

**Sample after rolling overnight at 150° F. with 3 ppb. BARACARB added.
***Data in parentheses are the average of two separate sample evaluations.

As can be seen from the data in Tables 6-8 even solutions in which the HEC is not solubilized or hydrated give good fluid loss control with the addition of the calcium carbonate bridging agent. Additionally, it can be seen that HEC hydrates differently in solutions containing solid calcium chloride as compared with solutions containing calcium chloride obtained via an 11.6 ppg solution. Specifically, it can be seen that solutions containing solid calcium chloride exhibit higher viscosities and lower fluid loss after hot rolling than solutions containing calcium chloride obtained from 11.6 ppg solution. Also, solutions containing solid calcium chloride require a larger concentration of ZnBr$_2$ for efficient hydration of the HEC at room temperature. Lastly, it can be seen that to effectively hydrate or solubilize activated HEC without heat, the brine solution should be formulated without the addition of solid calcium chloride.

EXAMPLE 6

Various brine solutions were prepared and evaluated for rheological properties as per the procedure of Example 5. The API fluid loss was obtained on the solutions after rolling 16 hours at 150° F. with and without the addition of 3 ppb BARACARB. The data are given in Table 9.

TABLE 9

| Composition of Solution | | | | | | | 1.5 ppb. NATROSOL 250 HHR | | | | | |
|---|---|---|---|---|---|---|---|---|---|---|---|---|
| | | | | | | | API Rheology | | | | * | ** |
| Density ppg. | % ZnBr₂ | % CaCl₂ | % CaBr₂ | 19.2 ppg bbl. | 11.6 ppg bbl. | 14.2 ppg bbl. | 95% CaCl₂ lb. | Initial | | After Rolling 16 Hr. @ 150° F. | | API Fluid Loss | API Fluid Loss |
| | | | | | | | | 600 | 300 | 600 | 300 | | |
| 16.0 | 22 | 11.7 | 31.0 | 0.3215 | 0.120 | 0.496 | 59.3 | 40 | 20 | 54 | 27 | 0.2 | 0.4 |
| 16.0 | 24 | 11.6 | 29.1 | 0.351 | 0.154 | 0.440 | 52.6 | 46 | 25 | 116 | 68 | 0 | 0 |
| 16.0 | 26 | 11.6 | 27.2 | 0.380 | 0.188 | 0.384 | 46.0 | 50 | 26 | 87 | 53 | 12 | 3.8 |
| 16.0 | 28 | 11.6 | 25.2 | 0.409 | 0.222 | 0.328 | 39.3 | 60 | 33 | 121 | 79 | 50 | 11 |
| 16.5 | 26 | 9.5 | 31.4 | 0.392 | 0.059 | 0.488 | 58.2 | 63 | 33 | 193 | 133 | 0 | 1.0 |
| 16.5 | 28 | 9.5 | 29.4 | 0.422 | 0.094 | 0.430 | 51.4 | 87 | 50 | 179 | 120 | 6.2 | 6.2 |
| 16.5 | 30 | 9.5 | 27.5 | 0.452 | 0.130 | 0.3715 | 44.4 | 101 | 61 | 211 | 148 | 82 | 8.4 |
| 16.5 | 32 | 9.5 | 25.5 | 0.4825 | 0.1655 | 0.313 | 37.5 | 112 | 70 | 223 | 160 | 82 | 14.2 |
| 16.5 | 34 | 9.5 | 23.6 | 0.5125 | 0.2005 | 0.255 | 30.6 | 116 | 74 | 220 | 160 | 97 | 16.5 |
| 17.0 | 30.6 | 7.6 | 30.8 | 0.475 | 0.015 | 0.453 | 54.1 | 84 | 48 | 162 | 106 | 10 | 3.4 |
| 17.0 | 32 | 7.6 | 29.5 | 0.497 | 0.040 | 0.412 | 49.2 | 91 | 53 | 159 | 105 | 26 | 6.6 |
| 17.0 | 34 | 7.5 | 27.5 | 0.528 | 0.0755 | 0.3525 | 42.1 | 106 | 64 | 213 | 148 | 146 | 11.4 |
| 17.0 | 36 | 7.5 | 25.6 | 0.559 | 0.101 | 0.292 | 35.0 | 124 | 78 | 239 | 171 | 116 | 18.2 |
| 17.0 | 38 | 7.5 | 23.6 | 0.590 | 0.149 | 0.232 | 27.8 | 126 | 80 | 212 | 152 | NC | 17.8 |
| 17.5 | 37.5 | 5.7 | 28.1 | 0.593 | 0.012 | 0.351 | 41.9 | 95 | 55 | 172 | 112 | 95 | 7.4 |
| 17.5 | 38 | 5.6 | 27.4 | 0.6075 | 0.026 | 0.326 | 38.9 | 101 | 60 | 248 | 175 | 112 | 14.9 |
| 17.5 | 40 | 5.6 | 25.4 | 0.6395 | 0.063 | 0.264 | 31.6 | 118 | 73 | 240 | 172 | 95 | 17.9 |
| 17.5 | 42 | 5.6 | 23.4 | 0.6715 | 0.101 | 0.202 | 24.2 | 140 | 91 | 224 | 162 | 109 | 20.4 |
| 18.0 | 44 | 3.9 | 25.0 | 0.7235 | 0.019 | 0.229 | 27.3 | 158 | 101 | 234 | 169 | 63 | 16.6 |
| 18.0 | 46 | 3.9 | 23.0 | 0.7565 | 0.058 | 0.165 | 19.7 | 216 | 148 | 226 | 162 | 65 | 19.1 |

*Sample after rolling @ 150° F.
**Sample after rolling @ 150° F. with 3 ppb BARACARB added.

As can be seen from the data in Table 9, brine solutions having a density of from about 16.0 to 17.0 ppg containing the minimum amount of zinc bromide exhibit good fluid loss control even in the absence of a bridging agent.

EXAMPLE 7

Various thickened brine solutions were formulated by mixing together various aqueous salt solutions and the activated HEC used in Example 2. Following mixing for 5 minutes on a Multimixer, the solutions were rolled 55 minutes at 74° F. and the API rheology obtained. Thereafter, the API rheology and fluid loss were obtained after rolling the solutions at 74° F. for 16 hours and after further rolling of the solutions an additional 16 hours at 150° F. The data are given in Table 10.

TABLE 10

| Density ppg. | Composition of Brine | | | | | | | 1 Hour @ 74° F. API Rheology* | | | | 1.5 ppb NATROSOL 250 HHR 16 Hours @ 74° F. API Rheology | | | | | 16 Hours @ 150° F. API Rheology | | | | |
|---|---|---|---|---|---|---|---|---|---|---|---|---|---|---|---|---|---|---|---|---|---|
| | % ZnBr₂ | % CaCl₂ | % CaBr₂ | 19.2 ppg. bbl. | 11.6 ppg. bbl. | 14.2 ppg. bbl. | 95% CaCl₂ lb. | H₂O bbl. | AV | PV | YP | GS | AV | PV | YP | GS | Fluid Loss | AV | PV | YP | GS | Fluid Loss |
| 14.4 | 20.0 | 7.0 | 29.8 | 0.263 | 0.231 | 0.4355 | 0 | 0.0585 | 34 | 26 | 16 | 2 | 47 | 31 | 32 | 6 | 8 | 57 | 37 | 40 | 15 | 4 |
| 14.4 | 26.0 | 18.7 | 11.4 | 0.340 | 0.6145 | 0.0455 | 0 | 0 | 44 | 31 | 26 | 3 | 64 | 42 | 45 | 11 | 15 | 74 | 45 | 58 | 15 | 5 |
| 14.4 | 20.4 | 7.8 | 28.8 | 0.272 | 0.261 | 0.419 | 0 | 0.048 | 28 | 22 | 12 | 2 | 46 | 31 | 30 | 6 | 8 | 55 | 39 | 33 | 18 | 4 |
| 14.6 | 24.0 | 13.8 | 19.7 | 0.320 | 0.4605 | 0.2195 | 0 | 0 | 32 | 26 | 13 | 1 | 58 | 39 | 38 | 9 | 5 | 67 | 42 | 51 | 13 | 7 |
| 14.6 | 21.2 | 9.4 | 27.4 | 0.2865 | 0.320 | 0.3935 | 0 | 0 | 18 | 17 | 2 | 0 | 46 | 34 | 24 | 5 | 5 | 56 | 39 | 34 | 19 | 2 |
| 14.8 | 23.2 | 11.0 | 24.1 | 0.314 | 0.372 | 0.314 | 0 | 0 | 37 | 30 | 15 | 1 | 65 | 42 | 46 | 12 | 7 | 75 | 45 | 61 | 16 | 2 |
| 14.8 | 25.0 | 12.4 | 21.1 | 0.338 | 0.420 | 0.242 | 0 | 0 | 38 | 29 | 19 | 2 | 68 | 43 | 50 | 12 | 14 | 76 | 47 | 59 | 16 | 7 |
| 14.8 | 22.0 | 7.9 | 29.1 | 0.3015 | 0.272 | 0.4265 | 0 | 0 | 24 | 22 | 5 | 0 | 54 | 37 | 34 | 8 | 2 | 66 | 40 | 52 | 12 | 11 |
| 15.0 | 24.0 | 9.5 | 25.8 | 0.329 | 0.325 | 0.346 | 0 | 0 | 38 | 29 | 18 | 2 | 68 | 43 | 51 | 13 | 13 | 76 | 43 | 67 | 17 | 4 |
| 15.0 | 26.0 | 11.0 | 22.4 | 0.3565 | 0.3785 | 0.265 | 0 | 0 | 44 | 32 | 24 | 2 | 68 | 42 | 53 | 13 | 11 | 80 | 48 | 65 | 18 | 5 |
| 15.0 | 22.8 | 6.4 | 30.7 | 0.3165 | 0.224 | 0.4595 | 0 | 0 | 41 | 30 | 22 | 2 | 62 | 40 | 44 | 12 | 12 | 70 | 43 | 55 | 10 | 15 |
| 15.2 | 24.8 | 8.0 | 27.4 | 0.3445 | 0.2775 | 0.378 | 0 | 0 | 57 | 39 | 37 | 6 | 80 | 47 | 66 | 19 | 16 | 85 | 37 | 96 | 26 | 11 |
| 15.2 | 26.8 | 9.5 | 24.1 | 0.372 | 0.331 | 0.297 | 0 | 0 | 54 | 37 | 35 | 5 | 74 | 44 | 60 | 16 | 24 | 81 | 47 | 69 | 21 | 12 |
| 15.2 | 23.6 | 5.0 | 32.3 | 0.332 | 0.177 | 0.491 | 0 | 0 | 40 | 30 | 20 | 3 | 65 | 40 | 51 | 13 | 17 | 74 | 42 | 64 | 9 | 23 |
| 15.4 | 25.6 | 6.6 | 28.9 | 0.360 | 0.2315 | 0.4085 | 0 | 0 | 56 | 40 | 33 | 8 | 86 | 51 | 70 | 19 | 12 | 88 | 48 | 80 | 22 | 10 |
| 15.4 | 27.6 | 8.1 | 25.7 | 0.3885 | 0.2845 | 0.327 | 0 | 0 | 68 | 46 | 45 | 4 | 83 | 46 | 75 | 22 | 12 | 96 | 51 | 90 | 27 | 17 |
| 15.4 | 24.4 | 3.7 | 33.7 | 0.348 | 0.131 | 0.521 | 0 | 0 | 49 | 33 | 32 | 7 | 71 | 42 | 58 | 15 | 21 | 77 | 40 | 74 | 19 | 18 |
| 15.6 | 26.4 | 5.2 | 30.4 | 0.3765 | 0.1845 | 0.439 | 0 | 0 | 56 | 35 | 43 | 8 | 79 | 45 | 68 | 19 | 12 | 87 | 47 | 81 | 21 | 16 |
| 15.6 | 28.4 | 6.7 | 27.1 | 0.405 | 0.240 | 0.355 | 0 | 0 | 64 | 43 | 42 | 5 | 81 | 46 | 71 | 20 | 27 | 88 | 48 | 81 | 23 | 14 |
| 15.6 | 25.2 | 2.3 | 35.1 | 0.364 | 0.0845 | 0.5515 | 0 | 0 | 52 | 34 | 36 | 8 | 77 | 43 | 69 | 18 | 35 | 82 | 43 | 79 | 22 | 14 |
| 15.8 | 27.2 | 3.9 | 31.8 | 0.3925 | 0.1405 | 0.467 | 0 | 0 | 61 | 41 | 41 | 8 | 83 | 45 | 77 | 23 | 26 | 91 | 49 | 85 | 26 | 48 |
| 15.8 | 29.2 | 5.4 | 28.5 | 0.4215 | 0.1955 | 0.383 | 0 | 0 | 66 | 44 | 44 | 10 | 89 | 49 | 80 | 24 | 37 | 91 | 49 | 84 | 25 | 33 |
| 15.8 | 26.0 | 1.0 | 36.5 | 0.380 | 0.0385 | 0.5815 | 0 | 0 | 54 | 33 | 42 | 6 | 73 | 40 | 67 | 18 | 83 | 81 | 43 | 77 | 23 | 27 |
| 16.0 | 28.0 | 2.6 | 33.1 | 0.4095 | 0.0955 | 0.495 | 0 | 0 | 67 | 45 | 44 | 9 | 84 | 44 | 81 | 25 | 21 | 96 | 50 | 93 | 29 | 120 |
| 16.0 | 30.0 | 4.1 | 29.8 | 0.4385 | 0.151 | 0.4105 | 0 | 0 | 69 | 45 | 48 | 11 | 88 | 46 | 85 | 24 | 47 | 95 | 53 | 85 | 30 | 83 |

*AV = Apparent Viscosity; PV = Plastic Viscosity; YP = Yield Point; GS = 10-Second Gel Strength As can be seen from the data in Table 10, the heavy brines containing zinc bromide, calcium bromide and calcium chloride can be readily viscosified at ambient temperature provided that the minimum percent zinc bromide in the brine is the larger of 20% or 4(D-9.5)% wherein D is the density of the solution in ppg. Preferably, the zinc concentration is greater than 4(D-9)%, more preferably greater than 4(D-8.5)%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

We claim:

1. A thickened brine solution having a density in the range of from about 14.2 ppg to about 15.6 ppg and consisting essentially of water, at least 20% by weight zinc bromide, calcium bromide, and a viscosifying amount of hydroxyethyl cellulose.

2. The brine solution of claim 1 containing calcium chloride in an amount up to (2×-33) weight percent wherein × is the weight percent zinc bromide.

3. The brine solution of claim 1 wherein said calcium bromide is present in an amount of from about 14.5 to about 41.3%.

4. The brine solution of claim 3 wherein the zinc bromide is present in an amount of from about 20 to about 46.9%.

5. The brine solution of claim 2 wherein calcium chloride is present in an amount of from about 0.1 to about 20%, and said calcium bromide is present in an amount of from about 9.4 to about 42%.

6. The brine solution of claim 5 wherein the zinc bromide is present in an amount of from about 20 to about 37%.

7. The brine solution of claim 1, 2, 3, 4, 5, or 6, wherein said hydroxyethyl cellulose is activated such that said hydroxyethyl cellulose will substantially hydrate or solubilize in said brine without the necessity for mixing at elevated temperatures.

8. A method of preparing a thickened brine solution comprising admixing an aqueous solution having a density in the range of from about 14.2 ppg to about 15.6 ppg and consisting essentially of water, at least 20% by weight zinc bromide and calcium bromide, with a viscosifying amount of hydroxyethyl cellulose.

9. The method of claim 8 wherein said aqueous solution has a density in the range of from about 14.2 ppg to about 15.2 ppg and contains from about 14.5 to about 39.5% by weight calcium bromide.

10. The method of claim 9 wherein the concentration of zinc bromide is from about 20% to about 45%.

11. The method of claim 8 wherein said aqueous solution has a density in the range of from about 14.2 ppg to about 14.5 ppg and contains from about 0.1 to about 20% calcium chloride, and from about 9.4 to about 34.6% calcium bromide.

12. The method of claims 8, 9, 10, or 11 wherein said hydroxyethyl cellulose is activated such that said hydroxyethyl cellulose will substantially hydrate or solubilize in said brine without the necessity for mixing at elevated temperatures.

13. The method of claims 8, 9, or 10, wherein said admixing is carried out at elevated temperatures.

* * * * *